Robert J. Campana
Earle C. King
INVENTORS

BY Neal J. Mosely
their Attorney

Robert J. Campana
Earle C. King
INVENTORS

BY [signature]

their Attorney

United States Patent Office 2,842,964
Patented July 15, 1958

2,842,964

PRESSURE GAUGE FOR HOT LIQUIDS

Robert J. Campana, Mars, and Earle C. King, Evans City, Pa., assignors to Mine Safety Appliances Company, Pittsburgh, Pa., a corporation of Pennsylvania Application June 21, 1954, Serial No. 438,000

2 Claims. (Cl. 73—410)

This invention relates to new and useful improvements in pressure measuring apparatus or pressure gauges and more particularly to a pressure gauge for measuring the pressure of hot liquids.

In the art of handling hot liquids in general and liquid metals in particular there has arisen a need for a reliable pressure gauge which will measure both static pressure and rapidly varying pressures. In measuring pressures of liquids at elevated temperatures it is necessary that a pressure gauge include a means for protecting the measuring portions of the gauge from heat and also to protect the gauge against leakage of hot liquids through the pressure sensing element.

It is therefore one object of this invention to provide a new and improved pressure measuring gauge for measuring the pressures of hot liquids.

Another object of this invention is to provide a new and improved pressure gauge for hot liquids which is reliable and accurate for both static and varying pressures.

Another object of this invention is to provide a new and improved pressure measuring gauge for hot liquids having a means to protect the measuring portion of the gauge from heat and also having a means to prevent the leakage of hot liquids past the pressure sensing element of the gauge.

Other objects will become apparent from time to time throughout the specification and claims as hereinafter related.

This invention comprises the new and improved construction and combination of parts and their operating relation one to another, which will be described more fully hereinafter, and the novelty of which will be particularly pointed out and distinctly claimed.

Figure 1:
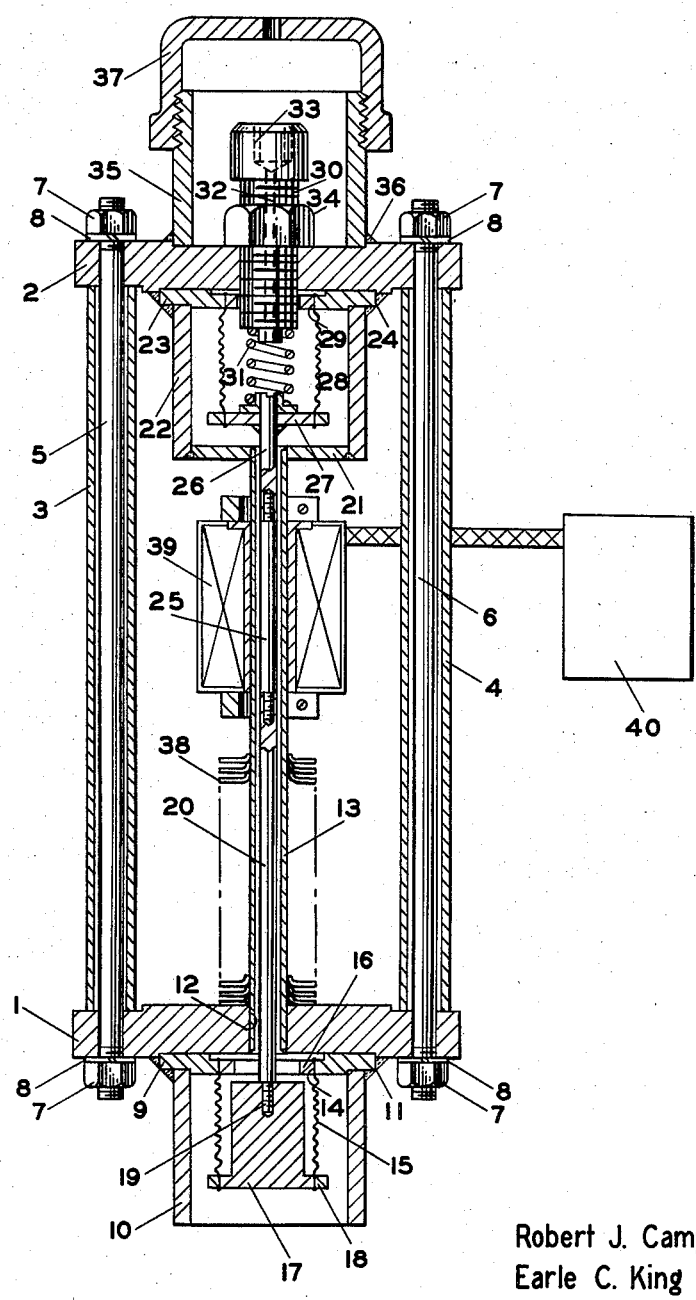
Figure 2:
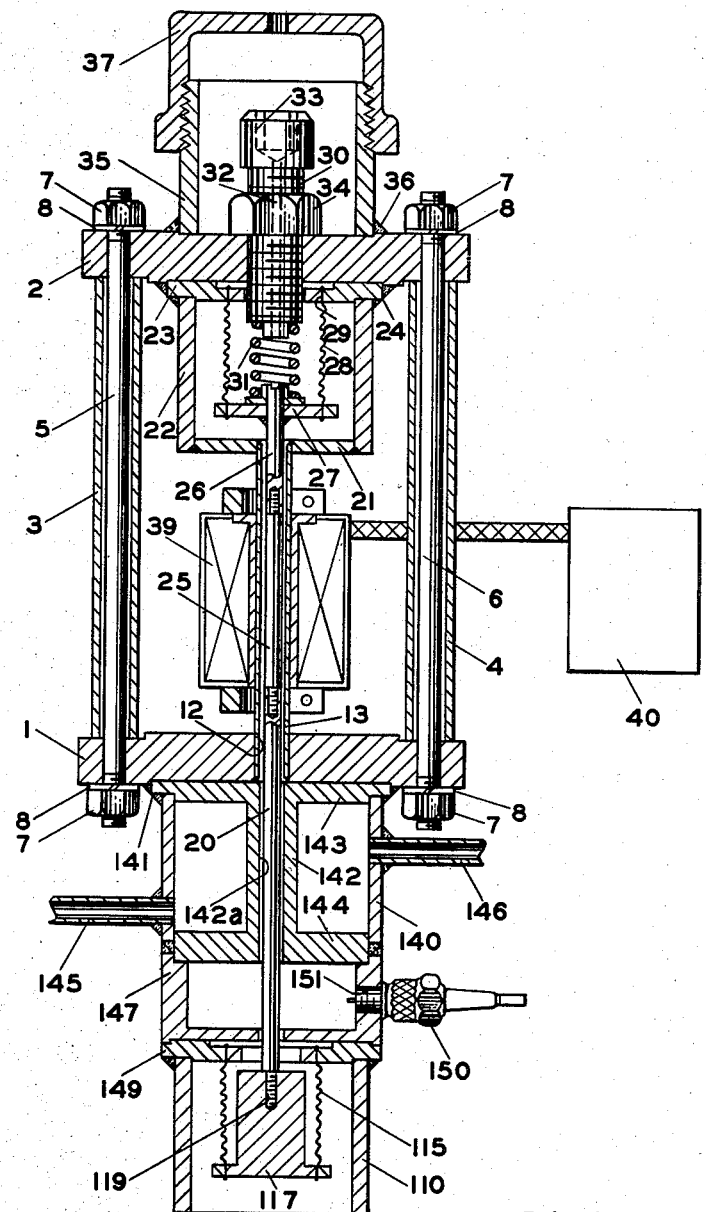

In the accompanying drawings, to be taken as a part of this specification, there are clearly and fully illustrated two preferred embodiments of this invention, in which drawing, Fig. 1 is a view in longitudinal central section of one embodiment of the pressure gauge which comprises this invention, and Fig. 2 is a view in longitudinal central section of another embodiment of this pressure gauge which utilizes a different cooling means from that shown in Fig. 1.

Referring to the drawings by characters of reference and more particularly to Fig. 1 there is shown one form of this improved pressure gauge which comprises a pair of spaced end plate members 1 and 2. The plate members 1 and 2 are spaced from each other by a plurality of sleeve members 3 and 4 and are secured together by rod members 5 and 6 having their opposite ends threaded and secured in place by a plurality of nuts 7 and having spacer washers 8. On the under side of the lower plate 1 there are secured a disc shaped supporting member 9 and a tubular member 10 by which the gauge is secured to the container of liquid whose pressure is to be measured.

The disc shaped member 9 and tubular member 10 are secured together and to the plate member 1 by welding as indicated at 11. The plate member 1 is provided with an aperture 12 in which there is secured the lower end of a tubular member 13. The disc shaped member 9 is provided with an aperture 14 in which there is secured the open end of a bellows 15. The bellows 15 is secured in the aperture 14 by an annular ring member 16 which is welded to the bellows and to the disc shaped member 9. The bellows 15 is secured at its lower end to a block member 17 which closes the end of the bellows. The bellows 15 is secured to the block member 17 by an annular ring shaped member 18 which is welded to the bellows and to the block member 17. The block member 17 has a threaded recess 19 which receives the lower threaded end portion of a thrust rod 20. The upper end of the tubular member 13 is secured in the end wall 21 of a cup shaped casing member 22 which is supported on a disc shaped member 23 and welded to the upper plate member 2 as indicated at 24. The thrust rod 20 has a middle section 25 and an upper section 26 which are removably connected to each other. The upper end portion 26 has a plate member 27 secured thereon which is secured in turn to a bellows 28 which seals an opening 29 in the disc shaped member 23. The upper plate member 2 has a threaded bolt member 30 extending therethrough and supporting at its lower end one end of a spring 31 the other end of which is supported on the plate member 27. The bolt member 30 is provided with a vent passage 32 for venting the space within the bellows 28. The upper end of the bolt member 30 is provided with a polygonal recess 33 for receiving one end of an Allen wrench for adjustment thereof. The bolt member 30 is also provided with a lock nut 34 for securing the bolt member against inadvertent adjustment. Extending upward from the upper face of the plate member 2 is a tubular member 34 which is welded to the plate member 2 as at 36 and which has its upper end closed by a threaded cap member 37. The lower portion of the tubular member 13 has a plurality of heat transfer fins 38 secured thereon which are operable to dissipate heat which would otherwise be conducted from the hot vessel whose pressure is measured by this apparatus. The upper portion of the tubular member 13 has secured thereon a differential transformer coil 39 which functions as the measuring element for this gauge. The central thrust rod portion 25 is a soft iron member which provides a moveable core within the transformer coil 39 and which is moved according to the pressure sensed by the bellows 15. The position of the soft iron rod 25 determines the electrical output of the transformer 39, which output is recorded on any suitable electrical recording instrument 40 which may have a scale calibrated in units of pressure.

In operation this pressure measuring gauge is secured to a conduit or pressure vessel containing a molten liquid whose pressure is to be measured. The supporting tubular member 10 may, if desired, be provided with threads for a threaded connection to the conduit or other pressure vessel or may be connected thereto by welding, soldering or the like. Changes in pressure of the molten liquid are recorded by the bellows 15 which is operable to move the thrust rod 20 upward and downward in accordance with said pressure changes. The position of the soft iron rod portion 25 within the transformer coil 39 as determined by the bellows 15 will determine the electrical output of the transformer coil 39 which output is recorded on a suitable electrical instrument. The setting of this gauge may be varied by adjusting the compression of the spring 31 by adjustment of the threaded bolt member 30, The heat transfer fins 38 positioned on the lower portion of the tubular member 13 are operable to dissipate most of the heat which would otherwise be conducted from the hot liquid in the vessel whose pressure is being measured by this gauge. This dissipation of heat is necessary so that the pressure measurements will not be distorted by the effect of increased temperature. The spring constant of the lower bellows 15 is very small relative to the spring constant of the upper bellows 28 and spring 31 so that temperature changes at the lower bellows do not alter substantially the setting of the instrument. The annular clearance between the tubular member 13 and the thrust rod 20 is sufficiently small that in the event of a leak in the bellows 15 the hot liquid leaking through the annular space around the rod 20 will be solidified by transfer of heat through the heat transfer coils and will thus prevent leakage of the hot liquid. The upper bellows 28 provides a gas tight seal which will prevent leakage of gases from the vessel whose pressure is being measured in the event of an occurrence of a leak in the lower bellows 15.

In Fig. 2 of the drawings there is shown a slight modification of the pressure gauge shown in Fig. 1 in which the heat transfer fins 38 are replaced with a liquid cooling arrangement and the apparatus is provided with an electrical leak detector. In Fig. 2 all of the parts which are identical with those in Fig. 1 are given the same reference numerals and only additional parts are named and described. In this form of pressure gauge the plate member 1 has a tubular casing member 140 provided thereunder and secured thereto by welding as at 141. The tubular member 140 has a spool shaped member 142 having a longitudinal passage 142ᵃ and upper and lower plate portions 143 and 144 which seal the upper and lower ends of the member 140 and provide an annular cooling chamber surrounding the lower end portion of the thrust rod 20. The member 140 has fluid inlet and outlet conduits 145 and 146 opening into the cooling chamber and arranged for circulation of the cooling fluid therethrough. A cup-shaped casing member 147 is secured to the tubular member 140 and defines a leak detection chamber 148. The cup-shaped member 147 has a disc-shaped member 149 secured thereon which supports the tubular member 110 by which the gauge is secured to the conduit or pressure vessel whose pressure is to be measured. The disc-shaped member 149 supports the upper end of the bellows 115 in the same manner as the bellows 15 is supported in Fig. 1. The bellows 115 is provided with a block member 117 and is connected thereto in the same manner as was described for the bellows 15 in Fig. 1. The block member 117 is provided with a threaded recess 119 which receives the threaded lower end portion of the thrust rod 20. The leak detection chamber 148 is provided with a leak detector 150 which is provided by inserting an automotive spark plug through a threaded aperture 151 in the wall of the cup-shaped member 147. In the event of a leak of molten metal from the container whose pressure is being measured the molten metal will create an electrical short across the contacts of the spark plug and will activate an electrical alarm which is not shown.

The operation of this pressure gauge is identical to that described in connection with the gauge shown in Fig. 1 except that a liquid cooling system is provided by the conduits 145 and 146 and the cooling chamber within the tubular member 140. In the same manner as described for Fig. 1 the annular space between the tubular member 142 and the thrust rod 20 is sufficiently small that it insures that any molten liquid which might leak past the bellows 115 in the event of a leak therein would be solidified and prevent further leakage.

Although this pressure gauge has been described for use with a molten metal it will be obvious to those skilled in the art that this gauge could be used in connection with any molten material, whether metallic or non-metallic, which solidifies at a temperature such that the material would provide a seal in the annular space between the thrust rod and the passage way which is surrounded by the heat transfer means. The term "solidifiable liquid" as used herein is intended to refer to any molten liquid, whether metallic or non-metallic, which is a solid at room temperature and which in the molten state would be frozen solid to provide a seal as described in connection with the heat transfer fins 38 in Fig. 1 and the cooling chamber 140 in Fig. 2.

Although there have been described only two modifications of this invention it will be obvious to those skilled in the art that other modifications of this invention are possible without departing from the scope and intent of this invention as defined in the appended claims.

We claim:

1. In a pressure gauge for measuring the pressure of hot solidifiable liquids, a pair of supporting plate members, a plurality of bolts and spacer members securing said plate members in spaced relation, a tubular member secured to one of said plate members and adapted to connect the same to the container whose pressure is to be measured, said one plate member having an aperture therein opening within said tubular member, a bellows member secured to said one plate member and closing said aperture, a second tubular member having one end secured in said aperture and extending toward said other plate member, a cup shaped casing member secured to said other plate member and having an aperture in which is secured and sealed the other end of said last named tubular member, said other plate member having an aperture therein, a threaded adjustment member extending through said last named aperture, a bellows member secured to said other plate member and sealing said last named aperture, a spring positioned between said adjustment member and the end wall of said last named bellows member, a thrust rod secured to and interconnecting said bellows members and extending through said second named tubular member, a plurality of heat transfer fins on said second named tubular member adjacent said one plate member, the annular space between said rod and said second named tubular member being sufficiently small in relation to the heat transfer capacity of said fins to insure solidification of any liquid leaking past said bellows, a transformer coil secured on said second named tubular member between said fins and the other end thereof, said thrust rod having a soft iron portion extending through and forming a moveable core for said coil, and the position of said thrust rod determining the output of said transformer, said output being measured by a suitable electrical instrument calibrated in units of pressure.

2. In a pressure gauge for measuring the pressure of hot solidifiable liquids, a pair of supporting plate members, securing means for maintaining said plate members in spaced relation, a first one of said plate members having an aperture therethrough, a bellows member secured to said first plate member and closing said aperture, a tubular member having one end secured in said aperture and extending toward said other plate member, a cup shaped casing member secured to said other plate member and having an aperture in which is secured and sealed the other end of said tubular member, said other plate member having an aperture therein, an adjustment member extending through said last named aperture, a bellows member secured to said other plate member and sealing said last named aperture, a spring positioned between said adjustment member and the end wall of said last named bellows member, a thrust rod secured to and interconnecting said bellows members and extending through said tubular member, heat transfer means on said tubular member adjacent said first plate member, the annular space between said rod and said tubular member being sufficiently small in relation to the heat transfer capacity of said heat transfer means to insure solidification of any liquid leaking past said bellows, means secured about said tubular member between said heat transfer means and the other end thereof responsive to movement of said thrust rod therethrough to actuate indicating means, whereby pressure sensed by said first named bellows is detected, said indicating means being calibrated in units of pressure, and means secured to said first plate member for connecting said pressure gauge to said container wherein pressure is to be measured.

References Cited in the file of this patent

UNITED STATES PATENTS

| | | |
|---|---|---|
| 1,456,847 | Geyer | May 29, 1923 |
| 2,260,837 | Kuehni | Oct. 28, 1941 |
| 2,266,315 | Frawley et al. | Dec. 16, 1941 |
| 2,414,457 | Eldridge et al. | Jan. 21, 1947 |
| 2,627,183 | Greenwood et al. | Feb. 3, 1953 |